Oct. 22, 1968  G. D. JENNEY  3,406,721
SPOOL SEIZURE OUTPUT BYPASS VALVE
Filed Sept. 30, 1965  2 Sheets-Sheet 1

INVENTOR
GAVIN D. JENNEY
BY Wilson, Robbins & Anderson
ATTORNEYS

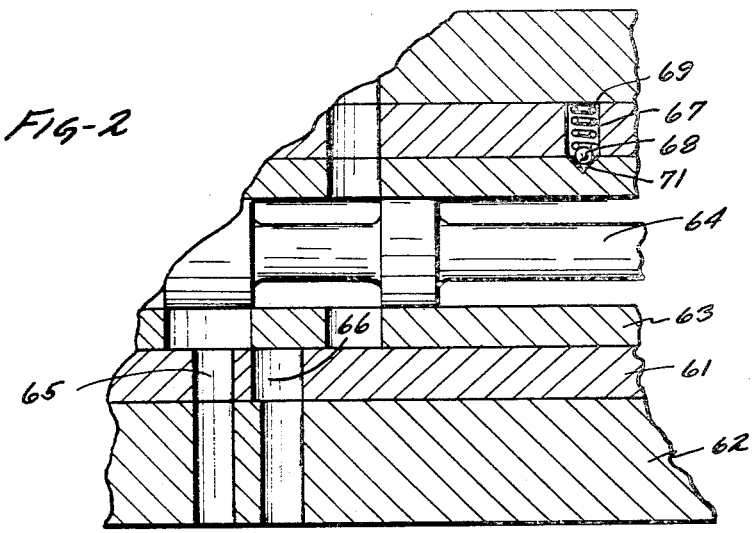
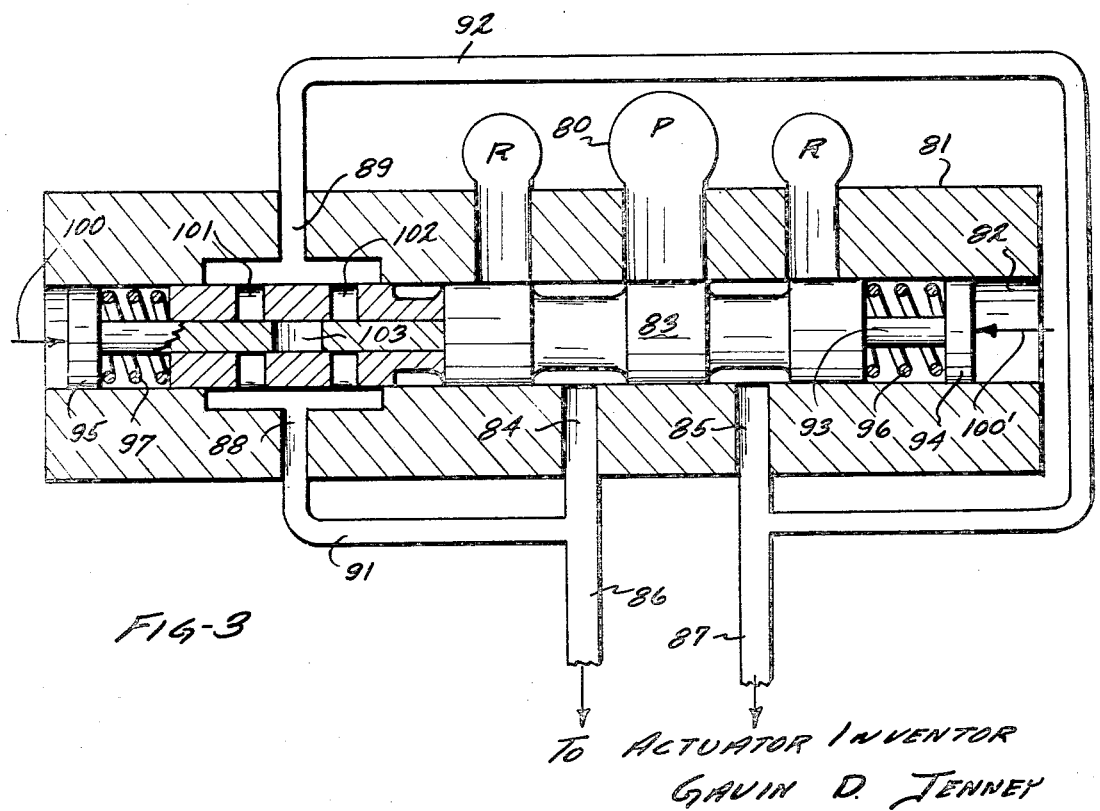

United States Patent Office 3,406,721
Patented Oct. 22, 1968

3,406,721
SPOOL SEIZURE OUTPUT BYPASS VALVE
Gavin D. Jenney, Sepulveda, Calif., assignor to Bell Aerospace Corporation, a corporation of Delaware
Filed Sept. 30, 1965, Ser. No. 491,680
16 Claims. (Cl. 137—625.69)

ABSTRACT OF THE DISCLOSURE

Disclosed is a bypass valve apparatus which is operative only in response to seizure of the control valve to bypass the output of the control valve. In one embodiment the bypass valve takes the form of a movable sleeve positioned in a bore within a housing, the sleeve being restrained against movement during the time the control valve normally slides within the cylinder formed within the sleeve. Upon seizure of the control valve to the sleeve, the sleeve moves against the restraining means to open the bypass valve ports, thereby bypassing the output of the control valve. In another embodiment, the bypass valve takes the form of an opening provided in a member connected to a rod which passes through an opening in the control valve which in turn is slidable within the cylinder formed by the housing. The control valve has connected thereto a pair of ports disposed one on each side of the opening, the opening being normally blocked. Upon seizure of the spool valve to the cylinder, the rod is permitted to move relative to the control valve, thereby connecting the opening to one of the bores, thereby opening the bypass valve to bypass the output of the control valve.

---

This invention relates generally to hydraeric control systems and more particularly to apparatus for overcoming errors which may occur in such systems resulting from a spool valve therein seizing to the wall of the chamber within which it normally slides.

The term hydraeric as used throughout the specification and the claims is intended to be generic to liquids and gasses and to include hydraulics and pneumatics. The term seize or seizing when applied to a valve mechanism as used throughout this specification and the claims is intended to mean a failure of the normally sliding portion of the valve mechanism to slide within the chamber in which it is housed in response to a command signal as a result of having become adhered to the wall of the chamber. Usually such adherence results from foreign matter carried by the hydraeric fluid having wedged between the sliding portion of the valve and the wall of the chamber.

It has been discovered from operation of hydraeric control systems, wherein the flow of hydraeric fluid is controlled by a mechanism designed to control a predetermined load, that failure sometimes occurs through the result of control valve seizure. When such occurs the flow of hydraeric fluid to the load control mechanism is not consistent with the command signals which are applied to the hydraeric system in the first instance. When such spool seizure does in fact occur, improper control of the load which is affixed to the hydraeric system can under some circumstances cause a failure of the entire mission. Such failure can produce disastrous results in given circumstances and it has been found necessary to provide means whereby such failure from spool seizure can be eliminated.

Accordingly, it is an object of the present invention to provide a spool valve output bypass apparatus operative only upon seizure of said spool valve.

It is another object of the present invention to provide a spool valve output bypass apparatus which operates automatically in response to seizure of said spool valve.

It is further an object of the present invention to provide a spool valve output bypass apparatus which is simple, rugged and requires little or no maintenance.

Other and more specific objects and advantages of the present invention both as to its organization and method of operation will become apparent from a consideration of the following description taken in conjunction with the accompanying drawing which is presented by way of example only and is not intended as a limitation upon the scope of the present invention as set forth in the appended claims and, in which:

FIG. 2 is a fragmentary, schematic diagram illustrating an alternative embodiment of a portion of the structure as illustrated in FIG. 1; and FIG. 3 is an alternative embodiment of a bypass apparatus in accordance with the present invention.

Figure 1:
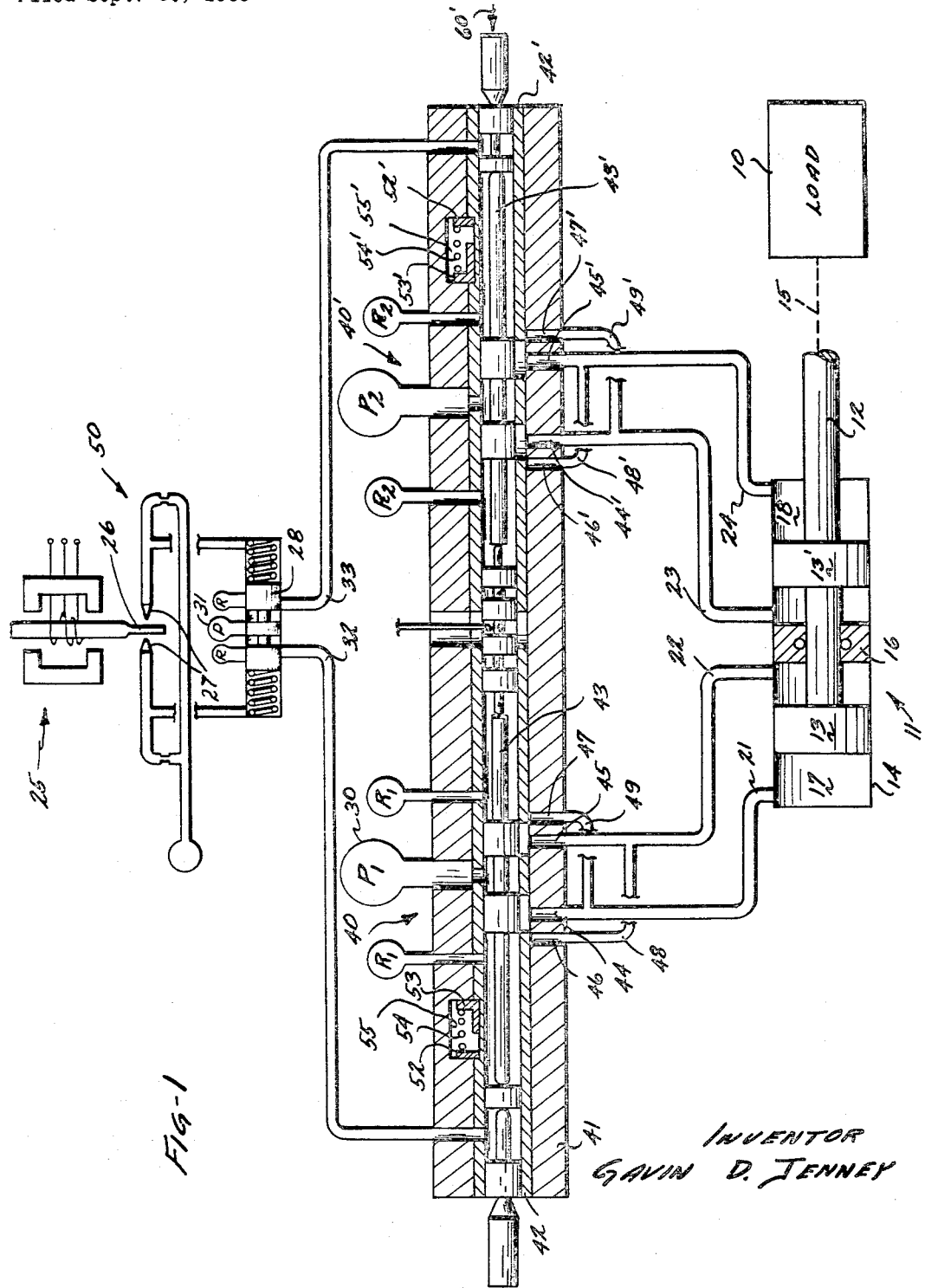
FIG. 1 is a schematic diagram of a hydraeric system including a bypass apparatus in accordance with the present invention.

In accordance with the present invention, a hydraeric system for controlling the flow of a hydraeric fluid through output ports to thereby control a load includes a bypass apparatus for eliminating control valve seizure errors. Such apparatus includes a bypass passageway which interconnects the output ports through which the hydraeric fluid flows. Disposed within the passageway means and closing the same during normal operation is a bypass valve means. The bypass valve means is operative only in response to seizure of the control valve means. Such seizure causes the bypass valve means to open thus establishing communication between the output ports.

Referring now to the drawings and more particularly to FIG. 1 thereof, there is illustrated schematically a system embodying a bypass apparatus in accordance with the present invention. As is there in shown a load 10 controlled as to its position as a result of the flow of the hydraeric fluid from a source thereof 30 (also indicated as $P_1$) through a valve mechanism 40 which is in turn controlled as a result of hydraeric and/or mechanical signals applied thereto. The hydraeric signals may emanate from a servo valve 50 while the mechanical signals are applied thereto as indicated by the arrows 60–60'. The hydraeric fluid flows into an actuator 11 to move an actuator rod 12 which is coupled to actuator pistons 13–13' which are slidably disposed within a cylinder 14. The actuator rod 12 is interconnected to the load 10 as indicated by the dashed line 15, for the purpose of manipulating the same. The cylinder 14 is separated by means of a divider member 16 into chambers 17 and 18. A pair of passageways 21 and 22 direct fluid into the chamber 17 on each side of the piston 13 while the passageways 24 and 23 direct fluid in to the chamber 18 on each side of the piston 13'.

As indicated above, the flow of the hydraeric fluid into the actuator 11 is controlled at least in part by means of the servo valve 50. Servo valve 50 is of the type which is well known in the art and for example, includes a torque motor 25 to which electrical signals may be applied. The operation of the torque motor in response to the electrical input signals causes a flapper 26 to move between a pair of nozzles 27 to apply a hydraeric signal to a spool valve 28 which controls the flow of fluid from a source under pressure thereof as indicated at 31 through a pair of passageways 32 and 33, to opposite ends of the control valve 40–40'. The operation of the servo valve 50 having the various parts as generally indicated is well known in the prior art and further description thereof will not be given herein. For additional information respecting the operation of such a servo valve attention is directed to U.S. Patent 2,947,286.

It should be noted that the control valves 40–40' are substantial duplicates of each other. Therefore, the description given hereinafter with respect to the control valves 40–40' will be given only with respect to that portion designated as control valve 40. The similar parts of the apparatus designated control valve 40' will be indicated by using the same reference numerals primed.

As is shown in FIG. 1 the control valve 40 is formed from a portion of the housing 41 which is fixed or alternatively may be a fixed sleeve which is inserted within a bore within the housing. The fixed portion 41 of either housing or sleeve is utilized to define the various ports as will be described hereinafter. Disposed within the housing 41 is a movable sleeve 42 which is slidably disposed within a bore formed by the housing 41. Slidably disposed within the movable sleeve 42 is a movable spool control valve 43. The housing 41 defines a pair of output ports 44 and 45 which are connected by means of the passageways 21 and 22 to the actuator cylinder 14 as above described. Also defined by the housing 41 is a pair of bypass ports 46 and 47. The bypass port 46 is interconnected by means of passageway 48 to the passageway 22 while the bypass port 47 is interconnected by means of passageway 49 to the passageway 21. Restraining means in the form of a pair of key members 52 and 53 are held apart by a resiliently deformable means such as a spring 54 within a key way such as a cavity 55 formed by the inner surface of the bore provided in the housing 41 and the outer surface of movable sleeve 42. The combination of the key members 52 and 53 along with the spring 54 restrain the movable sleeve 42 so that it is substantially fixed with respect to the housing 41 during normal operating conditions of the spool control valve 43. It should be noted that under these conditions the movable sleeve 42 blocks the bypass ports 46 and 47 so that there is no fluid flow therethrough. Under these operating conditions, as the spool valve 43 is displaced to the left, for example, as viewed in FIG. 1, fluid is caused to flow from the source 30 thereof through the output port 44 to the chamber 17 to cause movement to the actuator rod 12 as is well known in the prior art.

In the event spool valve 43 is subject to seizure with respect to the internal bore of the movable sleeve 42, then the forces normally applied to the spool valve 43 are sufficient to cause the movable sleeve 42 to be translated against the force of the spring 54 to the right or left along with spool valve 43. Upon the occurrence of such movement, bypass port 46 or 47 (depending upon the direction of movement) is opened thus bypassing the output ports 44 and 45. For example, should the spool valve 43 have a greater force applied to the left side thereof than to the right and simultaneously be seized with respect to movable sleeve 42, movable sleeve 42 is carried toward the right as viewed in FIG. 1. Under these circumstances bypass port 46 remains closed by the movable sleeve 42. However, the bypass port 47 is now opened thus causing the two passageways 21 and 22 to be interconnected. Such interconnection can be traced as follows. Starting at output port 44 through bypass passageway 49, through bypass port 47, and through output port 45 to passageway 22.

Under these operating conditions no pressure differential can be created across piston 13 within the chamber 17 of the actuator 11. Under these conditions, therefore, the flow of fluid from the source 30 thereof in response to the control or command signals applied to the system can have no effect upon the load. It should however be noted that as illustrated in FIG. 1, the control valve 40' operates in parallel with control valve 40 and in the event that there is no seizure between the spool control valve 43' and the movable sleeve 42', control of the load is maintained by means of the piston 13', through flow of fluid through the passageways 23 and 24 into chamber 18. Such continued control is effective since the design of the system is such that the hydraeric pressure signals applied through passageways 32 and 33 and the mechanical signals applied as indicated by the arrows 60–60' are each of sufficient force to move the combination of the control spool valve 43–43' along with the end connecting isolating pistons, along with the movable sleeve 42–42' in the event of a spool seizure with respect to either side thereof. In the event there is a spool seizure of both spool control valves 43 and 43' with respect to the movable sleeves 42 and 42', then each of the pairs of output ports are bypassed in the manner above described.

By reference now to FIG. 2 there is therein illustrated an alternative embodiment of a restraining means for maintaining the slidable sleeve fixed with respect to the housing or fixed sleeve during normal operating conditions. As is therein shown a fixed sleeve 61 is disposed within a bore in the housing 62. Disposed within the bore defined by the fixed sleeve 61 a movable sleeve 63. A control spool valve 64 is slidably disposed within the movable sleeve 63 and translates therein to control the flow of fluid through an output port 65 defined by the housing and the sleeves. A bypass port 66 is also so defined but is maintained in a closed position. As is illustrated in FIG. 2 so long as normal operation of the spool valve 64 within the movable sleeve 63 continues, restraining means in accordance with the modification of FIG. 2 includes a spring 67 and a ball detent 68 which is disposed within a chamber 69 defined by the fixed sleeve 61, a recess 71 is defined within the movable sleeve 63 and receives a portion of the ball 68. In the event of a seizure of spool valve 64 with respect to the movable sleeve 63, the force exerted by the preload of spring 67 against the ball 68 is overcome and the ball 68 is caused to retract into the cylinder 69 thus permitting the movable sleeve to move with respect to the fixed sleeve. In the event of such movement, for example, to the right as viewed in FIG. 2 the bypass passageway 66 becomes open thus interconnecting the output port 65 with the other output port (not shown) as above described with respect to FIG. 1. Again under these circumstances the movable sleeve can continue to move along with the spool valve 64 so as to permit continued operation in the event there is a duplication of the output ports and bypass ports as was the case with respect to FIG. 1.

By reference now to FIG. 3 an alternative embodiment of a bypass valve mechanism is therein illustrated. As is shown in FIG. 3 a housing 81 defines a bore 82 therein. A spool control valve 83 is slidably disposed within the bore 82. The housing 81 defines output ports 84 and 85 which are connected respectively by means of passageways 86 and 87 to the actuator as is indicated by the arrows and the legend. Also defined by the housing 81 is a bypass port 88 and a bypass port 89. A passageway means 91 interconnects the bypass port 88 with the output port 84 through the passageway 86 while a second bypass passageway means 92 interconnects the bypass port 89 with the output port 85 through the passageway 87. A rod 93 is disposed within a bore provided substantially through the center of the spool control valve 83. The rod 93 is movable within the bore and has end caps 94 and 95 affixed thereto. Restraining means such as a spring or other resiliently deformable means 96 is disposed between one end of the spool valve 83 and the end cap 94 while a similar spring means 97 is disposed between the opposite end of the spool valve 83 and the end cap 95. The springs 96 and 97 are preloaded so that under normal operating conditions the rod 93 along with its end caps 94 and 95 and the spool valve 83 all move simultaneously together for the purpose of controlling the flow of fluid from the source 80 thereof to the actuator through the two passageway means 86 and 87. Such is accomplished by way of the input signals applied as is illustrated by the arrows 100–100' to the outside of the end caps 94 and 95 which may be hydraeric or mechanical or both. It should be noted that under these normal operating conditions the bypass passageway means 91 and 92 is maintained in a closed condition as is illustrated.

It should also be noted however that a bypass valve means is defined by that portion of the spool valve 83 on the left hand side of FIG. 3. As is therein shown, ports 101 and 102 are provided through the spool valve 83 while a port 103 is provided through the rod 93. Under the normal operating conditions, the port 103 is maintained in a non-aligned position with respect to the ports 101 and 102 thus precluding the flow of fluid through the bypass passageways 91 and 92. However, in the event that the spool valve 83 seizes within the bore 82 the forces applied to the end caps 94 and 95 of the rod 93 cause the rod 93 to translate to the right or left in response to the forces thus applied even though the spool valve 83 is now seized. Such translation of the rod with respect to the spool valve causes the bore 103 to become aligned with either the bore 101 or the bore 102. In either event the passageways 91 and 92 are then placed in communciation to thus interconnect the output passageways 86 and 87 to each other and thereby cause the spool valve 83 to be ineffective to manipulate the actuator under these conditions. It should of course be understood that the system as illustrated in FIG. 3 can be duplicated to provide a dual tandem control and bypass apparatus as was the case with respect to FIG. 1.

It should be further understood that the bypass valve mechanism as illustrated and described herein can be applied to any spool valve located at any position within a hydraeric control apparatus and need not necessarily be restricted to that particular spool valve which immediately controls the flow of hydraeric fluid to an actuator. For example, by reference to FIG. 1 hereof, the bypass valve could be utilized in conjunction with the spool valve 28 should such be desired.

While there has been disclosed several specific embodiments of a bypass apparatus in accordance with the present invention to eliminate spool seizure errors, it should be understood that such was done by way of illustration only and is not intended by way of limitation upon the scope of the present invention as defined in the claims as appended hereto.

What is claimed is:

1. In a hydraeric system for controlling the flow of hydraeric fluid to control a load, a bypass apparatus for eliminating control valve seizure errors, said bypass apparatus comprising:

a housing defining a cylinder and a pair of output ports;
control valve means slidably disposed within said cylinder and movable with respect thereto for controlling the flow of hydraeric fluid through said ports in response to command signals applied thereto;
normally closed bypass valve means;
passageway means interconnecting said output ports to said bypass valve means, said bypass valve means when open connecting said pair of output ports together through said passageway means;
restraining means operatively engaging said bypass valve means and maintaining said bypass valve means closed during normal operation of said control valve means; and
means interconnecting said restraining means and said control valve means and operative only upon seizure of said control valve means to overcome said restraining means thereby to open said bypass valve and connect said output ports together.

2. Bypass apparatus as defined in claim 1 in which said restraining means is a spring means having a spring preload of sufficient magnitude to maintain said bypass valve means closed during normal operation but which is overcome when said control valve seizes thereby opening said bypass valve means.

3. In a hydraeric servo control system including a spool valve for the control of hydraeric fluid flow from a source thereof to an actuator, an output bypass valve for eliminating spool seizure affects, said bypass valve comprising:

a cylinder having first and second output ports;
first and second passageway means respectively connecting said first and second output ports to said actuator;
third and fourth bypass ports defined by said cylinder;
third passageway means interconnecting said first passageway means and said third port;
fourth passageway means interconnecting said second passageway means and said fourth port; and
closure means operatively associated with said spool valve and maintaining said third and fourth ports closed during normal operation and interconnecting said third and fourth passageway means in response to a spool valve seizure.

4. A bypass valve as defined in claim 3 which said closure means is a slidable member disposed in said cylinder and includes spring means holding said slidable member stationary relative to said bypass ports during normal operation of said spool valve.

5. A bypass valve as defined in claim 4 in which said slidable member continues to move after seizure of said spool valve.

6. In a hydraeric system for controlling the flow of hydraeric fluid through output ports to control a load, a bypass apparatus for eleminating control valve seizure errors, said bypass apparatus comprising:

bypass passageway means interconnecting said output ports; and
bypass valve means connected to said passageway means and closing the same during normal system operation; said bypass valve means being operative in response to seizure of said control valve means to operate said bypass valve and open said bypass passageway means thereby interconnecting said output ports.

7. A bypass apparatus as defined in claim 6 in which said bypass valve means, in operation, is movable with respect to said output ports.

8. A bypass apparatus as defined in claim 6 in which said bypass valve means, in operation, is movable with respect to said control valve.

9. In a hydraeric control system for applying hydraeric fluid from a source thereof through output ports controlled by a spool valve to a desired load, a bypass apparatus for eliminating spool seizure effects comprising:

a housing defining a bore therein;
a movable sleeve disposed within said bore and receiving said spool valve slidably therein;
restraining means engaging said housing and said movable sleeve and having a predetermined force to restrain said sleeve from moving during normal operation of said spool valve;
a pair of bypass ports defined by said housing, said bypass ports being closed by said movable sleeve in its restrained position;
and passageway means interconnecting said bypass ports and said output ports; and
said movable sleeve being movable with respect to said housing in response to seizure of said spool valve and said predetermined force of said restraining means being overcome to open a bypass port and interconnect said output ports.

10. A bypass apparatus as defined in claim 9 in which said movable sleeve and said spool valve, after seizure of said spool valve, continue to move within said bore in said housing in response to command signals applied to said spool valve.

11. A bypass apparatus as defined in claim 9 in which said restraining means is a spring means seated within a cavity defined by said bore and said movable sleeve.

12. A bypass apparatus as defined in claim 9 in which said restraining means is a spring and ball detent seated within a cavity in said housing and engaging a recess in said movable sleeve.

13. In a hydraeric control system for applying hydraeric fluid from a source thereof through output ports controlled by a spool valve to a desired load, a bypass apparatus for eliminating spool seizure effects comprising:
   a housing defining a bore therein and a pair of bypass ports communicating with said bore, said spool valve being slidably disposed in said bore;
   passageway means interconnecting said output ports and said bypass ports;
   bypass valve means slidably disposed in said bore and closing said bypass ports during normal operation of said system;
   restraining means engaging said spool valve and said bypass valve means and having a predetermined force to maintain said bypass valve in said closed position; and
   said predetermined force of said restraining means being exceeded upon a seizure of said spool valve thereby to open said bypass valve means and interconnect said output ports.

14. In bypass apparatus as defined in claim 13 in which said bypass valve means includes a first member defining first and second ports communicating with said passageway means and movable with said spool valve, and a second member movable with respect to said first member defining a third port therethrough, said restraining means maintaining said third port in a non-communicating position with respect to said first and second ports during normal operation of said system.

15. A bypass apparatus as defined in claim 14 in which said first member is an extension of said spool valve and said second member is a rod slidably disposed within a bore defined by said spool valve.

16. A bypass apparatus as defined in claim 15 in which said rod extends through said spool valve and terminates by an end cap at each end thereof, and spring means disposed between said end caps and said spool valve at each end thereof.

References Cited

UNITED STATES PATENTS 2,947,286   8/1960   Baltus et al. _____ 137—82 X
3,253,613   5/1966   Richolt _____ 137—625.69 X WILLIAM F. O'DEA, *Primary Examiner.*
DENNIS H. LAMBERT, *Assistant Examiner.*